United States Patent
Wang

(10) Patent No.: US 8,340,286 B2
(45) Date of Patent: Dec. 25, 2012

(54) INTERLEAVING AND DEINTERLEAVING METHOD FOR PREVENTING PERIODIC POSITION INTERFERENCE

(76) Inventor: Ruixun Wang, Liupanshui (CN)

(*) Notice: Subject to any disclaimer, the term of this patent is extended or adjusted under 35 U.S.C. 154(b) by 1637 days.

(21) Appl. No.: 11/663,620

(22) PCT Filed: Aug. 29, 2005

(86) PCT No.: PCT/CN2005/001348
§ 371 (c)(1),
(2), (4) Date: Mar. 27, 2007

(87) PCT Pub. No.: WO2006/032186
PCT Pub. Date: Mar. 30, 2006

(65) Prior Publication Data
US 2012/0002808 A1    Jan. 5, 2012

(30) Foreign Application Priority Data

Sep. 22, 2004   (CN) .......................... 2004 1 0051679

(51) Int. Cl.
*H04L 9/00* (2006.01)
(52) U.S. Cl. .......... 380/44; 380/277; 713/186; 713/185; 713/170; 705/71; 705/76
(58) Field of Classification Search .................. 380/23, 380/25, 44, 277; 713/170, 185, 186; 705/35, 705/71, 76
See application file for complete search history.

(56) References Cited

U.S. PATENT DOCUMENTS

| | | | |
|---|---|---|---|
| 6,035,398 A * | 3/2000 | Bjorn | 713/186 |
| 6,175,923 B1 * | 1/2001 | Bailey | 713/186 |
| 6,332,193 B1 * | 12/2001 | Glass et al. | 713/170 |
| 6,363,485 B1 * | 3/2002 | Adams et al. | 713/186 |
| 2004/0123113 A1 * | 6/2004 | Mathiassen et al. | 713/185 |
| 2005/0005136 A1 * | 1/2005 | Chen et al. | 713/186 |
| 2005/0071647 A1 * | 3/2005 | Fujinuma et al. | 713/186 |
| 2007/0038867 A1 * | 2/2007 | Verbauwhede et al. | 713/186 |

OTHER PUBLICATIONS

Assad Moini and Azad M. Madni, Leveraging Biometrics for User Authentication in Online Learning: A Systems Perspective, IEEE Systems Journal, vol. 3, No. 4, Dec. 2009.*

* cited by examiner

*Primary Examiner* — David Pearson
*Assistant Examiner* — Amir Mehrmanesh
(74) *Attorney, Agent, or Firm* — Raymond Y. Chan; David and Raymond Patent Firm

(57) ABSTRACT

A method for implementing volatile cipher key and separate verification module by collecting physical features includes the steps of setting physical features sensor on a handset, collecting physical features information of every user in advance by a physical features sensor, transmitting the physical features to a control module, storing the physical features in a user database, resetting a cipher temporary storage unit after physical features sensor is away from the user's body, retrieving cipher data in the user database when registered user operates the handset, and checking by the control unit the user database has an identical record which matches the user's physical features.

16 Claims, 6 Drawing Sheets

INTERLEAVING AND DEINTERLEAVING METHOD FOR PREVENTING PERIODIC POSITION INTERFERENCE

BACKGROUND OF THE PRESENT INVENTION

1. Field of Invention

This present inventing relates to a method and apparatus for secrecy or secured communication, and more particularly to a method and apparatus of system user identification which can be adapted to recognize printing, handwriting, or customer figures.

2. Description of Related Arts

In current technique the most popular method of identifying a user for further operation on a system is using different kinds of IC cards. Recently some particular physical features information gathered from the user is used as the identification too. For example, the Chinese patent number 99815820, PCT/US99/29036 disclosed a method named "A system using the constantly changing physical features as the cipher key". This technique uses user's physical features as the cipher key while the physical features are constantly changing. The system using this technique gathers the image of the user's finger print. Cooperated with a random data generator, a portion of the image instead of the whole image is transmitted. Because the sections of the transmitted image are selected randomly and keep changing, un-authorized receiver can only get a partial instead of a whole image. The verification of the finger print image will be processed by a remote agent.

Another example, disclose by Chinese patent number 98812158, PCT/US98/23327, is a method named "Generating cipher key using biological statistic data". As this invention, finger print is first received and groups of features are collected. Those feature groups comprise a message generated according to the feature groups. In one embodiment, the message is a sample which consist the feature group. In an alternative embodiment, the message is a sub group which is not consisted in the sample. Another embodiment uses the feature groups of the finger print image to generate a digital certificate. The public cipher key is based on the finger print image.

For both methods, every terminal of verification module needs a relative physical feature collecting device. It courses resource wasting. Further more, once the password is set, it will be stored in the device, it is not safe.

SUMMARY OF THE PRESENT INVENTION

This present invention is a method for implement volatile cipher key and separate verification module by collecting physical features. In the invention, a handset comprises a physical features sensor. Every time when the handset is operating, the sensor collects and stores the user's physical features. This information is encrypted with composite clock data, additional password, unique device ID through an encryption algorithm. Then with the algorithm formula, generates a cipher. So that, even for the same part of the same body, every time the cipher generated will be different. Once the cipher is transmitted, the information of the physical features collected by the handset and other related information will be deleted immediately. The cipher data is transmitted to the verification module and is decrypted. First the device ID and the additional password are extracted and compared with the blacklist in the verification module database. If the device ID and the additional password are found in the blacklist, further operation will not be permitted, and a warning message will be delivered. At the same time the error information will be saved for investing. If the device ID and the additional password are not found in the blacklist, the system will check the registered device IDs and the additional password database to verify the cipher's validity. If the device ID is not registered, the additional password needs to be checked. If the password is accepted, further operation will be performed, otherwise, a warning message will be delivered. If the device ID and the additional password are registered, the cipher data will be decoded, and the physical features together with the clock data will be verified. Because the clocks can not be exactly synchronized, there is an error allowance. If the physical feature verification is passed, and the clock data confirmation is also within the error allowance, operation command will be performed. If the user is authorized, the operation will be permitted, otherwise, a warning message will be delivered. If the cipher of a same ID activates the warning multiple times, for example, 3 times, this ID will be saved in the blacklist database. Because of the clock information, even if the cipher is cloned during transmission, the clock information is clones as well. When this cloned cipher is sent to the verification module, the clock information will not be matched, and the cipher will not pass the verification. In order to decrypt the cipher, the way how the clock information is encoded into the data chain, as well as the encryption algorithm should be known. So it is almost impossible to be decrypted. The security of the system's data transmission and operation is guaranteed. The device ID and additional password further improve the security. In some situation the unique device ID can even be used for tracking and managing the users. For example using in financial strongbox usage, the control and management of hazardous articles, military issues, and nation securities, a unique device ID is needed for identification, which is sending the unique device ID together with the cipher. After a cipher is continuously rejected (for example, 3 times), the verification module will save the ID in the blacklist database and permanently reject it until the super-user delete it from the blacklist. The additional password is needed when one user is accessing another user's handset. Because when a handset is not registered, an additional password which is known only by an authorized user is needed to require the temporary validity.

An object of the present invention is a method of implementing volatile cipher key and separate verification module by collecting physical features. Based on the handset and the signal transmission channel, the method comprises the steps of:

a. providing a physical features sensor, a key microprocessor unit, a cipher generating unit, a cipher temporary storage unit, and a key cipher data transmission unit on a handset;

b. providing a cipher data reception unit, and a verification module which comprises a verification unit and a user database;

c. in special application, providing a handset which is electrically connected with wire and is not movable. The handset comprises a physical features sensor, a key microprocessor unit, and a keyboard;

d. using the physical features sensor described in step a and c, generating a cipher by cipher generating unit, saving the cipher in the cipher temporary storage unit, and transmitting the cipher date to the cipher data reception unit, verifying the registration of the cipher and saving the cipher in the user database; deleting the cipher from the cipher temporary storage unit after a predetermined period of time when the physical features sensor is disconnected from the user's physical body or after the cipher is transmitted successfully;

e. collecting user's physical feature information by a physical features sensor when the user is holding a handset which comprises the sensor, generating relative cipher by the cipher generating unit, saving the cipher in cipher temporary storage unit, transmitting the cipher key data to the cipher data reception unit by a key cipher data transmission unit through signal transmission channel, searching the user database according to the cipher by the verification unit, comparing if there is a same record; the comparing is processed by the verification unit, this verification unit is either provided in the verification module independently, or embedded in the lower-stage controlled object;

f. by comparing, if there is a same record in the database, the verification unit will send an command to the lower-stage controlled object; if there is no such a record, the verification unit will send a warning message, and save an error record.

Detail Description of this Method:

The handset also comprises a clock unit, a key button set, a display device, a main cipher arithmetic unit, a device ID and an additional cipher arithmetic unit, when performing the cipher generation and verification as in step d and e, the steps also comprise:

a. first, processing the physical feature information by the main cipher arithmetic unit and generating multiple bytes of main cipher;

b. generating an additional cipher with the device ID, current clock information, and additional password inputted by the key board, and saving in the additional cipher arithmetic unit;

c. reading the additional cipher by the key microprocessor unit from the additional cipher arithmetic unit, combining the additional cipher with the main cipher, saving the combined cipher in the cipher temporary storage unit, sending the data to the verification module; and d. checking whether the physical body is disconnected with the sensor by the key microprocessor unit, according to the process of the operation, deciding the time of delay to clean the cipher temporary storage unit, or according to the message of transmission successful returned by the transmission channel, to clean the cipher temporary storage unit.

The handset also comprises a key button set and a key screen. Controlled by the key microprocessor unit, the key button set receives the additional password and the temporary ID, and saves them into the additional cipher arithmetic unit, the key screen is controlled by the key microprocessor unit to display the operational information.

When the cipher data is transmitted to different task terminals, text or image display can be selected.

Another object of the present invention is:

An apparatus of implementing volatile cipher key and separate verification module by collecting physical features which comprises: a handset, signal transmission channel, a cipher data reception unit, and a verification module, the handset also comprises a physical features sensor, a key microprocessor unit, a cipher generating unit, a cipher temporary storage unit, and a key cipher data transmission unit; the physical features sensor is electrically connected with the key microprocessor unit and the cipher generating unit; the physical features sensor collects every user's physical feature information, the cipher generating unit generates relative cipher, the cipher is then saved in the cipher temporary storage unit, and transmitted by the key cipher data transmission unit to the cipher data reception unit through the signal transmission channel, the cipher registration is then verified, and is saved in the user database; when the physical features sensor is disconnected with the physical body, or when the cipher is transmitted successfully, the cipher temporary storage unit will be cleaned.

Detail Description of this Device:

The verification module comprises a cipher data reception unit, a verification unit, a user database; the verification module and the handset are preferably separated, and can be connected by wire or wireless. The verification unit is electrically connected with the cipher data reception unit, the user database, and the output interface. When the data from the handset is received, the verification unit performs the data comparison. The verification unit is either set in the verification module independently, or embedded in the lower-stage controlled object.

Compare to current technology, in the present invention, the handset comprises a physical features sensor which can collect different physical feature information from different users, and generate different cipher data. This cipher data is registered in database of the verification module. Next time when the cipher data from the handset is transmitted to the verification module, the verification module will compare it with the database, if the same record is found, further operation will be performed; if no registered record is found, a warning message will be delivered. In present invention, every time the cipher generated in the handset will be deleted when the physical body is disconnected from the sensor for a predetermined period of time. When the data is transmitted successfully, or after a predetermined period of time the data is still not transmitted successfully, the data will be deleted too. This will prevent potential security problem if the handset is lost. A handset can be used by multiple users and for multiple tasks, this reduces the system cost. The invention also has alarming function when the user is being intimidated, for example by special operation such as the sequence of multiple finger prints verification, or special code of additional password to alarm.

These and other objectives, features, and advantages of the present invention will become apparent from the following detailed description, the accompanying drawings, and the additional claims.

DETAILED DESCRIPTION OF THE PREFERRED EMBODIMENT

Figure 1:
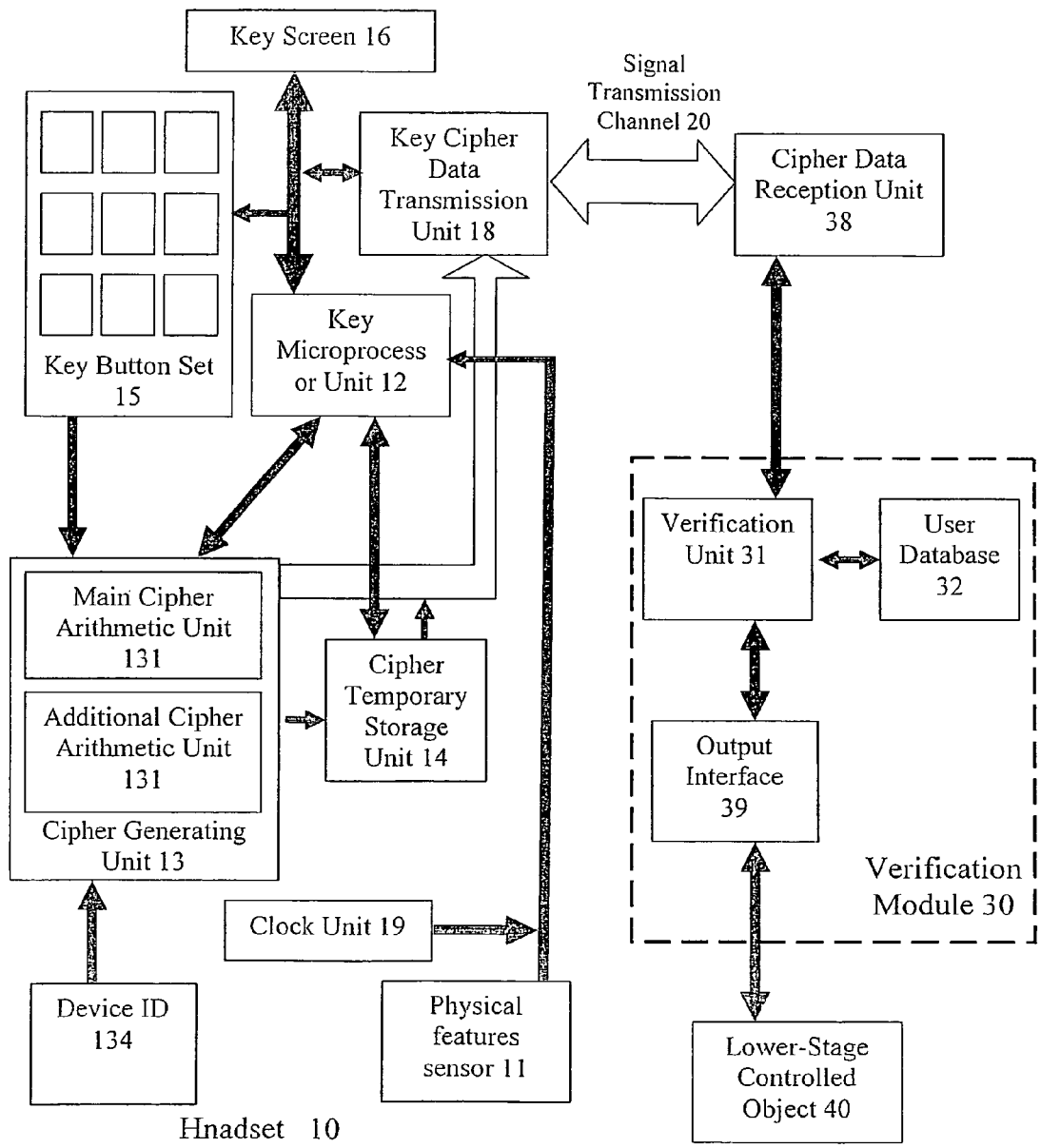
FIG. 1 is the block diagram of the method of implementing volatile cipher key and separate verification module by collecting physical features.

FIG. 1 illustrates a method of implementing volatile cipher key and verification module by collecting physical features. Based on the handset 10 and the signal transmission channel 20, the preferred embodiment of the method comprises:

a. providing a physical features sensor 11, key microprocessor unit 12, cipher generating unit 13, cipher temporary storage unit 14, clock unit 19, and key cipher data transmission unit 18 on a handset 10;

b. providing a cipher data reception unit 38, and verification module 30 which comprises verification unit 31 and user database 32;

c. in special application, the handset 10 is connected with the cipher data reception unit 38 with wire;

d. collecting every user's physical feature information by the physical features sensor 11, generating a cipher by cipher generating unit 13, saving the cipher in the cipher temporary storage unit 14, and transmitting the cipher date to the cipher data reception unit 38 by the key cipher data transmission unit 18 through a signal transmission channel 20, verifying the registration of the cipher and saving the cipher in the user database 32; deleting the cipher from the cipher temporary storage unit 14 when the physical features sensor 11 is disconnected from the user's physical body or after the cipher is transmitted successfully;

e. collecting user's physical feature information by the physical features sensor 11 when the user is operating the handset 10, generating relative cipher by the cipher generating unit 13, saving the cipher in the cipher temporary storage unit 14, transmitting the cipher key data to the cipher data reception unit 38 by the key cipher data transmission unit 18 through the signal transmission channel 20, searching the user database according to the cipher by the verification unit 31, comparing if there is a same record; the compare is processed by the verification unit 31, this verification unit 31 is either provided in the verification module 30, or embedded in the lower-stage controlled object 40;

f. by comparing, if there is a same record in the database 32, the verification unit 31 will send an command to the lower-stage controlled object 40; if there is no such a record, the verification unit 31 will send a warning message, and save an error record.

The handset 10 also comprises a main cipher arithmetic unit 131, a device ID 134, and an additional cipher arithmetic unit 133, when performing the cipher generation and verification as in step d and e, the steps comprise:

a. first, processes the physical feature information by the main cipher arithmetic unit 131 and generating multiple bytes of main cipher;

b. generating an additional cipher with the device ID, current clock information, and additional password inputted by the key board, and saving in the additional cipher arithmetic unit 133;

c. reading the additional cipher by the key microprocessor unit 12 from the additional cipher arithmetic unit 133, combining the additional cipher with the main cipher, saving the combined cipher in the cipher temporary storage unit 14, sending the data to the verification module 30; and d. checking whether the physical body is disconnected with the physical features sensor 11 by the key microprocessor unit 12, according to the process of the operation, deciding the time of delay to clean the cipher temporary storage unit 14, or clean the cipher temporary storage unit when receives the confirming information from the verification module 30.

In this embodiment, the handset also comprises a key button set 15, a key screen 16. Controlled by the key microprocessor unit 12, the key button set 15 receives the additional password, and saves them into the additional cipher arithmetic unit 133, the key screen 16 is controlled by the key microprocessor unit 12 to display the operational information.

The verification module 30 also comprises a clock unit 36 and a blacklist database 37. In step e, if no same record is found in the database, or the clock information is not within the error allowance, the verification unit 31 will deliver a warning message, and records the error message. If the cipher with the same ID actives the warning message twice continuously, the ID will be saved in the blacklist database 37.

The signal transmission channel 20 includes wire, wireless, and infrared; the key cipher data transmission unit 18, cipher data reception unit 38 also comprise electrically connected communication unit using wire, wireless or infrared.

The lower-stage controlled object 40 comprises different kinds of locks, computers, mobile phones, electrical ID certification, information management entrance, entrance guard, financial trade, network firewall, security management, and authorized operation.

The handset 10 also comprises mobile phone, PDA, POS, portable hard disk which are embedded or separate devices, and devices fixed in places with or without security guard.

The physical features sensor also comprises finger print verification sensor, or sensors for palm print, palm shape, face shape, DNA, acoustic wave, iris, or the sensor combination.

An alternative embodiment of the present invention is illustrated.

Figure 2:
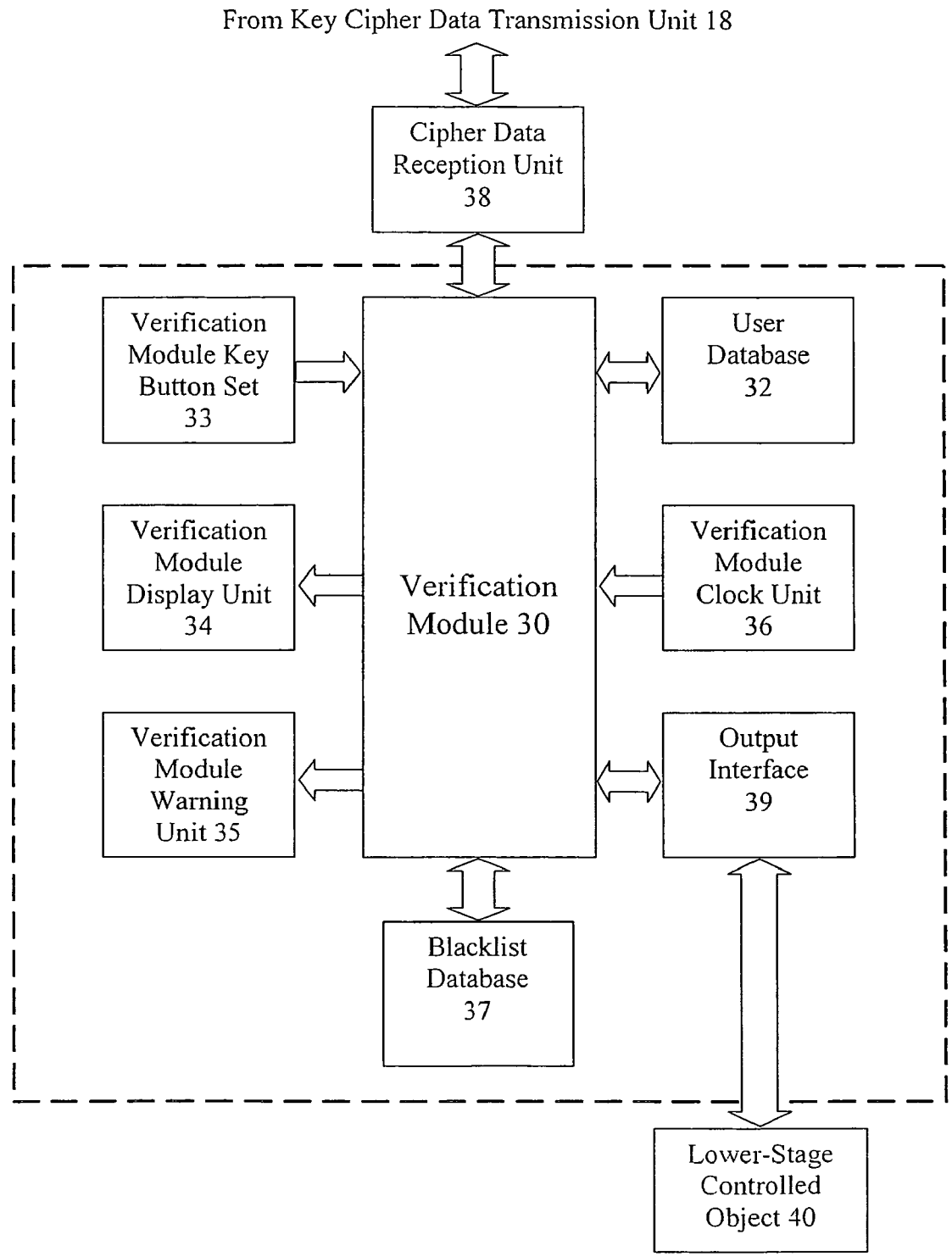
FIG. 2 is the block diagram of the verification module of an embodiment of this invention.

Referring to FIGS. 1 and 2, an apparatus of implementing volatile cipher key and verification module by collecting physical features comprises a handset 10, signal transmission channel 20, and a verification module 30. The handset 10 also comprises a physical features sensor 11, a key microprocessor unit 12, a cipher generating unit 13, a cipher temporary storage unit 14, and a key cipher data transmission unit 18; the physical features sensor 11 is electrically connected with the key microprocessor unit 12 and the cipher generating unit 13. The cipher temporary storage unit 14 is electrically connected with the cipher generating unit 13, and the key cipher data transmission unit 18.

The physical features sensor 11 collects every user's physical feature information, the cipher generating unit 13 generates relative cipher, the cipher is then saved in the cipher temporary storage unit 14, and transmitted by the key cipher data transmission unit 18 to the verification module 30 through the signal transmission channel 20, the cipher registration is then verified, and is saved in the user database 32; when the physical features sensor 11 is disconnected from the physical body, or when the cipher is transmitted successfully, the cipher temporary storage unit 14 will be cleaned.

The cipher data reception unit 38 is separate or embedded in the verification module 30, the verification module 30 also comprises a verification unit 31, a user database 32. The verification unit 31 is electrically connected with the cipher data reception unit 38, the user database 32, and the output interface 39. The verification module 30 receives the data from the handset 10, the verification unit 31 performs the data comparison.

The verification unit 31 is either set in the verification module 30 independently, or embedded in the lower-stage controlled object 40.

The handset 10 also comprises a key button set 15 and a key screen 16. The key button set 15 is connected with the key microprocessor unit 12, receives the additional password, and saves the password into the additional cipher arithmetic unit 133. The key screen 16 is connected with the key microprocessor unit 12 to display the operational information.

The handset 10 also comprises a clock unit 19, a main cipher arithmetic unit 131, a device ID 134, and additional cipher arithmetic unit 133. The main cipher arithmetic unit 131 processes the physical feature information and generates multiple bytes of main cipher; together with the device ID, current clock information, and additional password inputted by the key board, generates an additional cipher.

The signal transmission channel 20 includes wire, wireless, and infrared; the key cipher data transmission unit 18, cipher data reception unit 38 also comprise electrically connected communication unit using wire, wireless or infrared.

The physical features sensor 11 comprises finger print verification sensor, or sensors for palm print, palm shape, face shape, DNA, acoustic wave, iris, or the sensor combination.

FIG. 2 illustrates an alternative embodiment, the verification module 30 also promises a verification module key button set 33, a verification display unit 34, and a verification module warning unit 35. The verification module key button set 33 is connected with the verification unit 31, and is adapted to input operation command. The verification module display unit 34 is controlled by the verification unit 31, and is adapted to display the operation result, warning message. In this embodiment, the display unit is preferably a LCD display driven by EV A-D2004 OAR, obviously in other alternative embodiments different display devices and drivers can be selected. The verification module warning unit 35 is controlled by the verification unit 31 to send sound warning signals.

The verification module 30 also promises a verification module clock unit 36 and blacklist database 37. If there is no record found in the database is the same as the received data, or the clock information is not within the error allowance, the verification unit 31 will send a warning message, and save an error record at the same time. If one cipher actives warning three times continuously, the cipher will be saved in the blacklist database 37.

In one embodiment the verification module 30 is physically a separate module, or alternatively can be realized by computer program.

The output interface 39 is controlled by the verification unit 31, and is communicated with the lower-stage controlled object 40 by RS485 communication. In an alternative embodiment, it can also use CAN bus or other forms of buses, as well as LAN, interne, the connection is by wire or wireless. After forming the control network, every lower-stage controlled object 40 is controlled by the network system, and sends local data to the network controlled main computer.

In a preferred embodiment, the physical features sensor 11 comprises finger print sensor. In other alternative embodiments, it can also comprise DNA sensor, face shape sensor, palm shape sensor, or other biological sensors.

Figure 3:
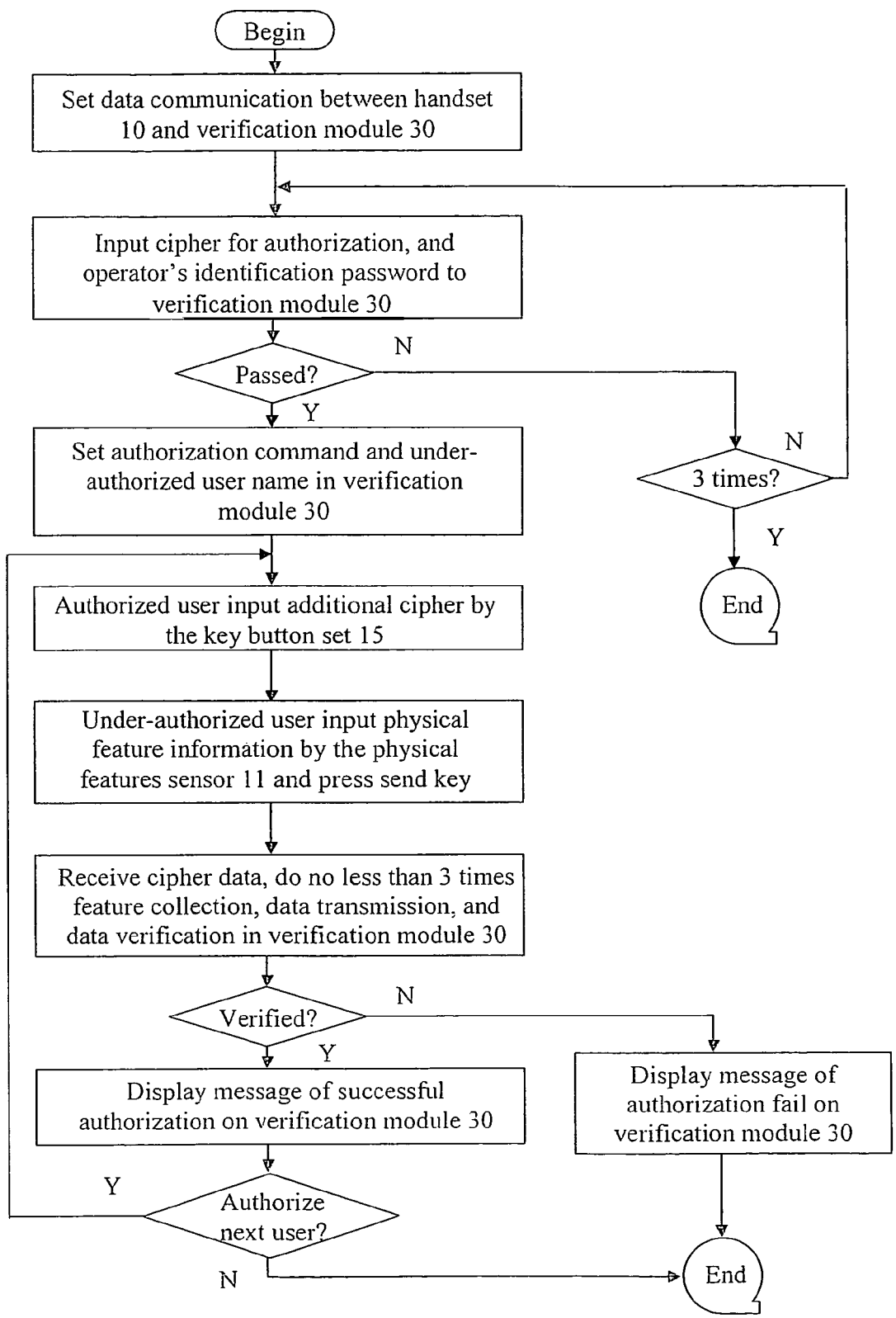
FIG. 3 is the flow diagram of the method of user authorization.

Referring to FIG. 3, the present invention provides cipher authorization function and authorized cipher management function. Cipher saving uses encryption method. The cipher must be read by an encryption algorithm, or the real cipher must be decrypted from the read out data. The cipher has three levels: super cipher (first level), manager cipher (second level), and user cipher (third level). The verification module 30 doesn't have any cipher initially. When it is operated at the fist time, a default super cipher will be generated by the system. This default super cipher needs to be changed when it is used at the first time. Except the super cipher, other ciphers which are not use by groups, needs to cooperate with at least two more types of ciphers in order to improve the security.

The super cipher can authorize or cancel manager cipher and user cipher, can perform next operation. If necessary, super cipher can authorize multiple equal super ciphers.

The manager cipher can authorize or cancel user cipher, can perform next operation, but can't authorize or cancel super cipher and manager cipher. The user cipher can only perform next operation.

The verification module 30 doesn't need manager cipher if it is not connected with a network. Super cipher and manager cipher can access the list of authorized users. No operation can check the user cipher.

Figure 4:
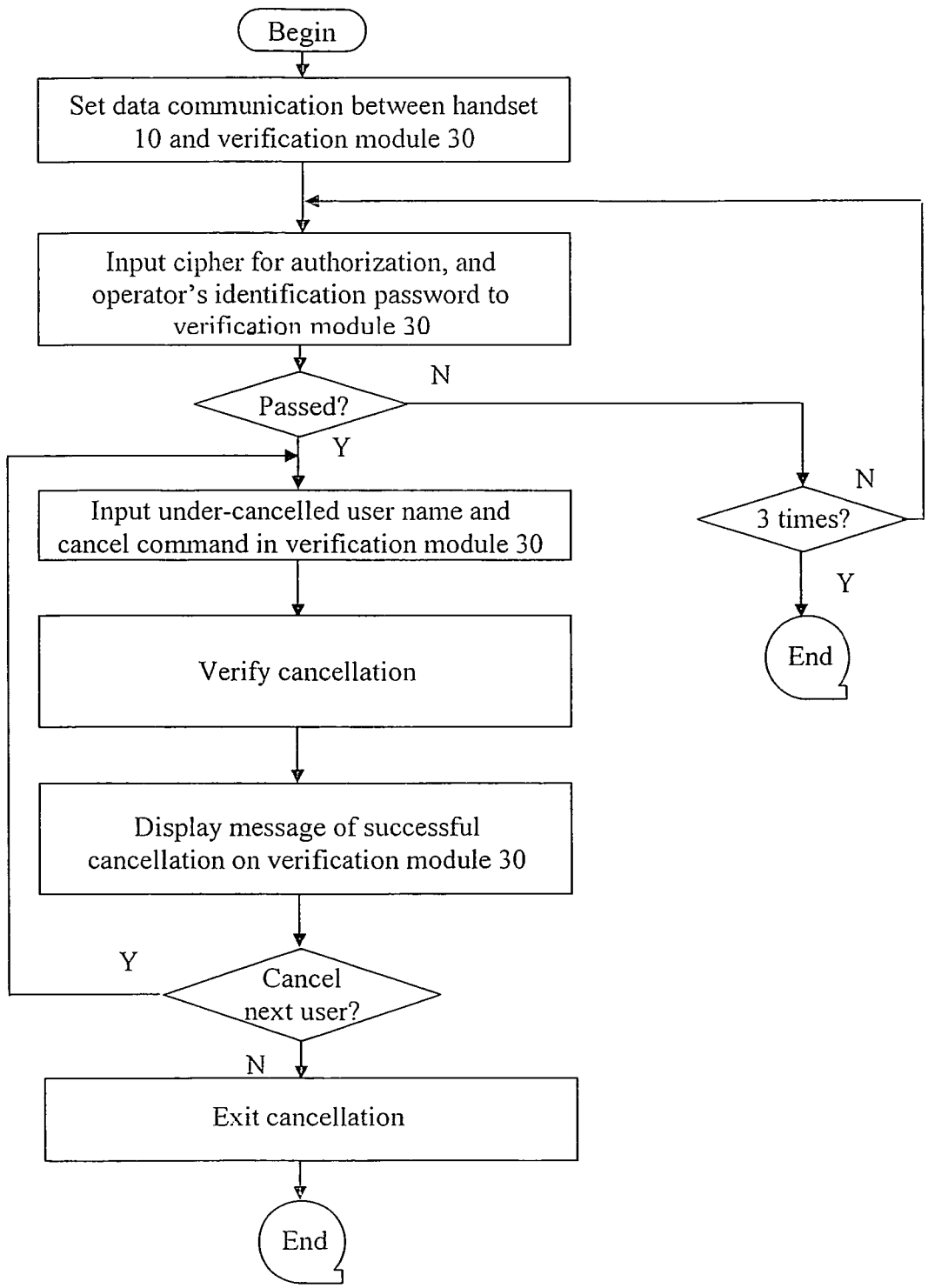
FIG. 4 is the flow diagram of the method of user cancellation.

FIG. 4 illustrates the process to cancel a user.

By network, the system can be managed by multiple terminals, it also can be remote managed through Internet or specialized network. Well known technology in this field can be used to connect the server or integrated terminal with terminals, such as different kinds of buses and network technology based on twisted-pair cable (for example, RS485, CAN, Ethernet). This kind of system is generally used in group management such as in hotel. Resident housing can also use it if necessary, for example, used in central management and alarm of resident door locks and furniture locks.

In one embodiment the verification module 30 comprises a verification module warning unit 35. In an alternative embodiment, the verification module 30 doesn't comprise a warning unit, warning can be delivered by communication channel. In one embodiment, the system can automatically call the property owner, the building/distribute manager or police office.

In another alternative embodiment of the present invention, the handset 10 comprises a mobile phone. The additional password can be inputted but the keys on the mobile phone. For different operation objects, the cipher data can be transmitted directly to the verification module 30 by wire or wireless. It can also be transmitted through mobile phone network such as GSM or CDMA. During authorization verification, the user put the fingers on the finger print exam area of the physical features sensor 11, and input the relative additional password, then press sending key. If the data is directly sent to the verification module 30 in a short distance, the key cipher data transmission unit 18 should be located close to the receiving area of the cipher data reception unit 38 on the verification module 30. When the cipher data is verified, the handset will delete the cipher and wait for the next operation. The system can also provide client 24 hours anti-theft monitoring through specialized network, for example, monitoring cars and authorizing to remote shut down the circuit, gas supply of the alarmed car, locating the car with the positioning system. In one embodiment, the cipher data reception unit 38 in the car transmits the received data to the verification unit 31 to decode. The compare the decoded finger print data with the record in user database, if the finger print is identified, decode the additional password. Compare the decode data with the code map, and perform the relative operation accordingly. For example, verify the identification of the driver and control the lock, air conditioner, etc.

Because the handset 10 doesn't have any cipher, if it is lost, no further damage will be cost except the price of the device. Any substitutive handset 10 of the present invention, for example borrowed from neighbor or security department, can perform the same work. The lender doesn't need to worry about releasing his own password, same as the borrower. As a form of service, the building manager, security department, and other department can all provide public cipher key service.

In another alternative embodiment, mobile phone can be used for the handset 10 to pay the fees. First the bank registers the customer's finger print, links it with the user's account, and then saves in the database. During the trade, in the trader's POS terminal, use mobile phone's SMS, GPRS, or CDMA1X etc to send the amount of expenditure as well as the POS information to the bank, at the same time collect the finger print information by the sensor on the mobile phone. At the moment, the customer's finger print information are sent to the bank with the amount of expenditure, or by the wired collecting device provided by the trader, to verify the identification. The verification terminal has customer's finger print information, after verification, the bank will send the information to the trader's POS to print the receipt, and transfer relative amount of money to the trader, the trade is finished. It is convenient to make the payment, and can also help to pay other person's bill.

Figure 5:
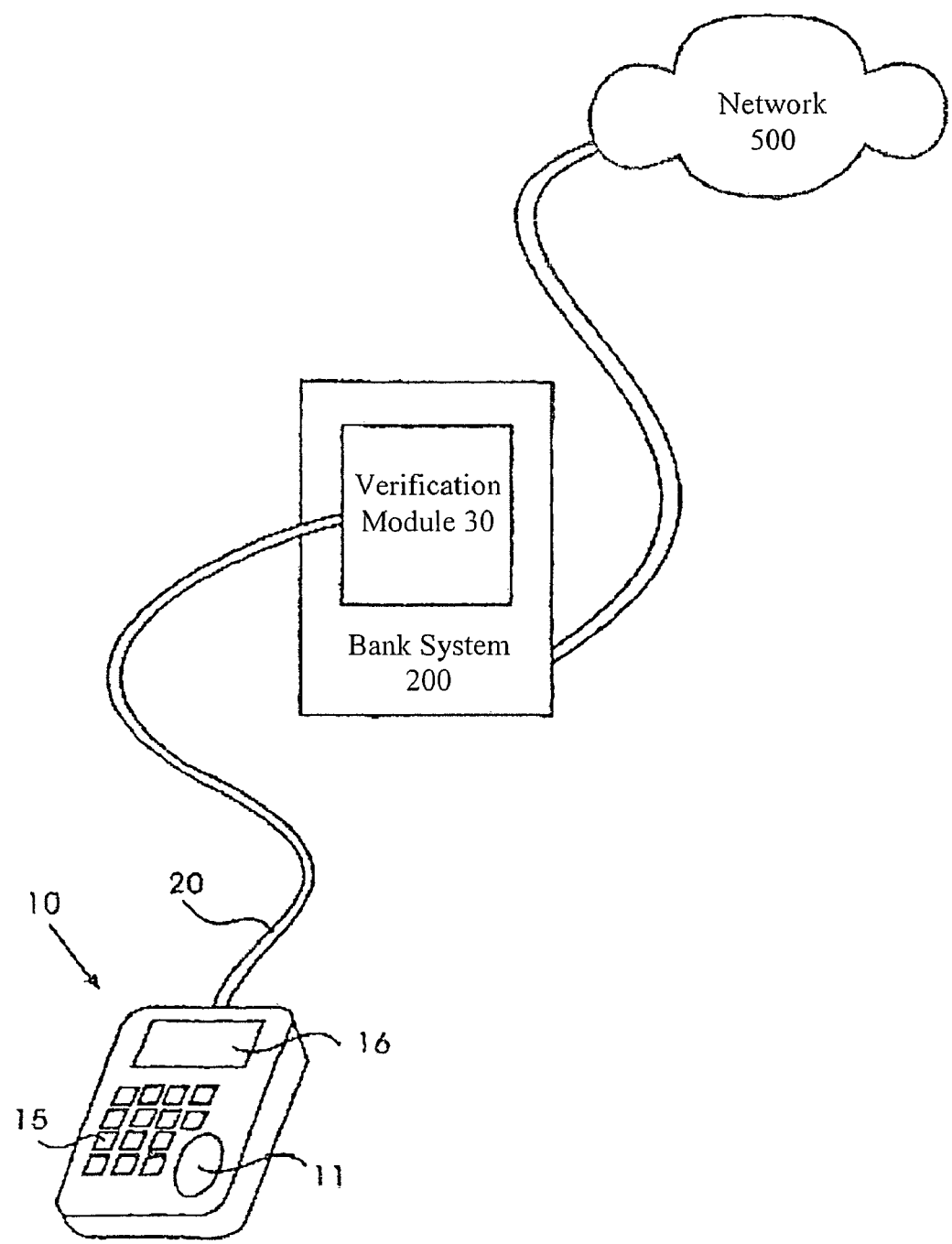
FIG. 5 illustrates the application in banking system.

FIG. 5 illustrates another alternative embodiment, the bank system. The communication channel 20 is wire communication. The handset 10 is a cipher input device similar to POS, and is connected with computer for registration. The process of registration is the same as the separated handset 10, when the data is saved in the database, the handset 10 has not record of the cipher. This device can also comprise a wireless cipher data receiving device 38 to receive data from a separated handset 10. This embodiment can also be used in ATM or POS machine. The bank system 200 can communicate with the third network information supplier, or more other networks through the network 500, to expand the functions.

Figure 6:
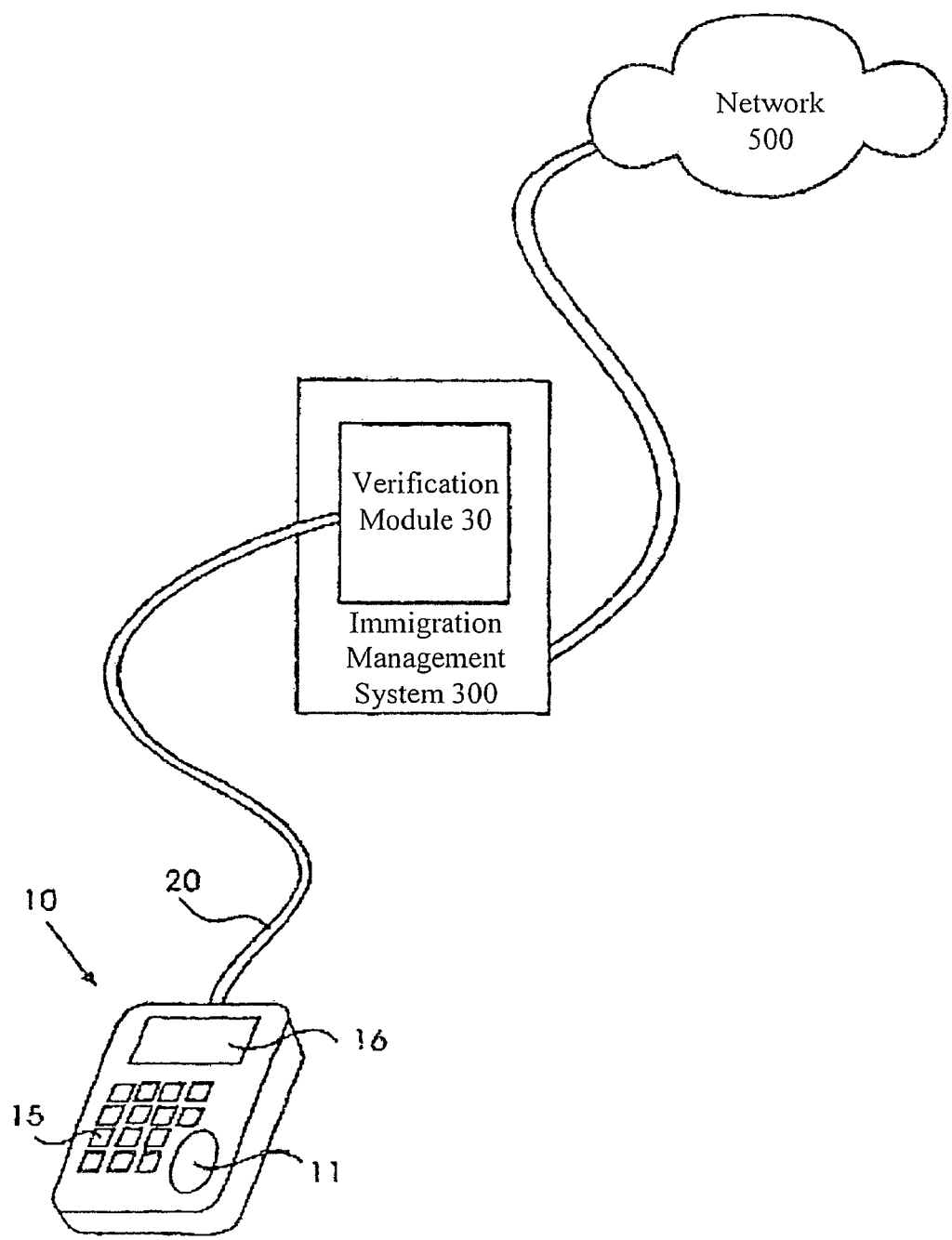
FIG. 6 illustrates the application in immigration control system.

FIG. 6 illustrates another alternative embodiment, the immigration management system. The communication channel 20 is wire communication. The handset 10 is connected with computer for entry registration. The process of registration is the same as the separated handset 10, when the data is saved in the database, the handset 10 has not record of the cipher. The immigration management system 300 can communicate with the bank system 200 or other security system by the network 500, to monitor if the person entering the county has any illegal trading record.

Other alternative embodiments of the present invention are also used in identification verification, computer power on, and digital signature.

Proved by practice, in the present invention, the handset comprises a physical features sensor, collects different physical feature information from different user, and generates different cipher data. This cipher data is registered in the database of the verification module. Later when it is used, the cipher data collected by the handset will be transmitted to the verification module and compared with the record in the database. If to the same data is recorded, the further operation will be performed, if not, warning message will be delivered. The cipher data and the physical feature information in the handset will be automatically deleted when the physical body is disconnected from the handset. This will avoid further security damage when the handset is lost. More over, a handset can be shared by multiple persons and in multiple tasks, this reduces the system cost, and is helpful to develop more functions.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of implementing volatile cipher key and separate verification module by collecting physical features based on a handset and a signal transmission channel, wherein said method comprises the steps of:
    (a) providing a physical features sensor, a key microprocessor unit, a cipher generating unit, a cipher temporary storage unit, and a key cipher data transmission unit on said handset;
    (b) providing a cipher data reception unit, and a verification module which comprises a verification unit and a user database;
    (c) connecting said handset with said cipher data reception unit through wire communication;
    (d) collecting each user's physical feature information separately by said physical features sensor, generating a corresponding cipher by said cipher generating unit, saving said corresponding cipher in said cipher temporary storage unit, transmitting a cipher key data to said cipher data reception unit by said key cipher data transmission unit through said signal transmission channel, verifying said cipher's registration, saving in said user database, deleting all information saved in said cipher temporary storage unit after a predetermined period of time when said physical features sensor is disconnected from a user's physical body, or when said cipher is transmitted successfully;
    (e) collecting user's physical feature information by said physical features sensor when the user is operating said handset, generating relative cipher by said cipher generating unit, saving said cipher in said cipher temporary storage unit, transmitting said cipher data to said cipher data reception unit by said key cipher data transmission unit through said signal transmission channel, searching said user database for said cipher by said verification unit, comparing if there is a same record, wherein said comparison is processed by said verification unit which is either provided separately in the verification module, or embedded in a lower-stage controlled object;
    (f) sending a command to said lower-stage controlled object by said verification unit if there is a same record in said database and the user is proved to be registered, otherwise sending a warning message, and saving an error record by said verification unit if there is no such a record,
    wherein said handset further comprises a clock unit, a cipher generating unit, a main cipher arithmetic unit, a device ID and an additional cipher arithmetic unit, wherein in said step (d) comprises the steps of:
    (d.1) processing said physical feature information by said main cipher arithmetic unit and generating multiple bytes of said main cipher arithmetic unit;
    (d.2) generating an additional cipher with said device ID, and inputting current clock information and additional password in said additional cipher arithmetic unit;
    (d.3) reading said additional cipher by a key microprocessor unit from said additional cipher arithmetic unit, combining said additional cipher with said main cipher, saving said combined cipher in a cipher temporary storage unit, sending corresponding data to said verification module; and
    (d.4) checking whether said physical body is disconnected with said sensor by said key microprocessor unit after transmitting the data, and periodically cleaning said cipher temporary storage unit.

2. The method, as recited in claim 1, wherein said handset also comprises a key button set and a key screen, wherein said key button set is controlled by said key microprocessor unit, receives an additional password, and saves the password into said additional cipher arithmetic unit, wherein said key screen is controlled by said key microprocessor unit to display the operational information.

3. The method, as recited in claim 2, wherein said verification module also comprises a clock unit and a blacklist database, wherein said step e also comprises steps of delivering a warning message, and recording the error message if no same record is found in the database, or the clock information is not within the error allowance, saving said ID in said blacklist database if the cipher with the same ID actives said warning message twice continuously.

4. The method, as recited in claim 3, wherein said signal transmission channel is using wire communication, wireless communication, or infrared communication, wherein said key cipher data transmission unit, said cipher data reception unit also comprise electrically connected communication unit using wire communication, wireless communication, or infrared communication.

5. The method, as recited in claim 4, wherein said lower-stage controlled object comprises different kinds of locks, computers, mobile phones, electrical ID certification, information management entrance, entrance guard, financial trade, network firewall, security management, and authorized operation.

6. The method, as recited in claim 5, wherein said handset also comprises mobile phone, PDA, POS, portable hard disk which are embedded or separate devices, and devices fixed in places with or without security guard.

7. The method, as recited in claim 6, wherein said physical features sensor also comprises finger print verification sensor, sensors for palm print, palm shape, face shape, DNA, acoustic wave, iris, or the sensor combination.

8. The method, as recited in claim 7, wherein said step of collecting physical feature information and said step of comparing information are performed by at least two separated devices.

9. An apparatus of implementing volatile cipher key and separate verification module by collecting physical features, comprising:
- a handset which comprises a clock unit, a cipher generating unit, a main cipher arithmetic unit, a device ID, and an additional cipher arithmetic unit;
- a signal transmission channel;
- a cipher data reception unit; and
- a verification module, wherein said handset comprises a physical features sensor, a key microprocessor unit, a cipher generating unit, a cipher temporary storage unit, a key cipher data transmission unit, and a cipher key power supplier, wherein said key microprocessor unit is electrically connected with said physical features sensor and said cipher generating unit, wherein said cipher temporary storage unit is electrically connected with said cipher generating unit and said key cipher data transmission unit, wherein said physical features sensor collects every user's physical feature information, wherein said cipher generating unit is arranged to generate a corresponding cipher, and save said cipher in said cipher temporary storage unit, wherein said key cipher data transmission unit is arranged to transmit said cipher to said cipher data reception unit through said signal transmission channel for verifying a cipher registration, wherein when said physical features sensor is disconnected from the physical body, or when said cipher is transmitted successfully, said cipher temporary storage unit is cleaned after a predetermined period of time, wherein said verification module comprises a verification unit, and a user database, wherein said verification unit is electrically connected with said cipher data reception unit, said user database, and an output interface, wherein said cipher data reception unit receives said data from said handset, transmits said data to said verification unit for performing data comparison, wherein a command is sent to a lower-stage controlled object by said verification unit if there is a same record in said database and the user is proved to be registered, otherwise a warning message is sent and an error record is saved by said verification unit if there is no such a record, wherein said physical feature is processed by said main cipher arithmetic unit and multiple bytes of said main cipher arithmetic unit are generated, wherein an additional cipher is generated with said device ID and a current clock information and additional password are inputted in said additional cipher arithmetic unit, wherein said additional cipher is read by a key microprocessor unit from said additional cipher arithmetic unit, wherein said additional cipher is combined with said main cipher, wherein said combined cipher is saved in said cipher temporary storage unit and corresponding data is sent to said verification module, wherein said key microprocessor unit is arranged to check whether said physical body is disconnected with said sensor after transmitting the data and said cipher temporary storage unit is periodically cleaned.

10. The apparatus, as recited in claim 9, wherein said cipher data reception unit is separated, or is embedded in said verification module.

11. The apparatus, as recited in claim 10, wherein said verification unit is separated in said verification module, or is embedded in a lower-stage controlled object.

12. The apparatus, as recited in claim 11, wherein said handset also comprises a key button set and a key screen, said key button set is connected with said key microprocessor unit, receives the additional password, and saves the password into said additional cipher arithmetic unit which is connected with said key microprocessor unit; wherein said key screen is connected with said key microprocessor unit to display the operational information.

13. The apparatus, as recited in claim 12, wherein said handset also comprises a clock unit, a main cipher arithmetic unit, a device ID, and an additional cipher arithmetic unit, wherein said main cipher arithmetic unit processes the physical feature information and generates multiple bytes of main cipher, then generates an additional cipher with said device ID, current clock information, additional ID inputted by key board.

14. The apparatus, as recited in claim 13, wherein said signal transmission channel is using wire communication, wireless communication, or infrared communication, wherein said key cipher data transmission unit, said cipher data reception unit also comprise electrically connected communication unit using wire communication, wireless communication, or infrared communication.

15. The apparatus, as recited in claim 14, wherein said physical features sensor also comprises finger print verification sensor, sensors for palm print, palm shape, face shape, DNA, acoustic wave, iris, or the sensor combination.

16. The apparatus, as recited in claim 15, wherein said verification module also comprises a clock unit and a blacklist database, wherein said step e also comprises delivering a warning message, and recording the error message if no same record is found in the database, or the clock information is not within the error allowance, saving said ID in said blacklist database if the cipher with the same ID actives said warning message twice continuously.

\* \* \* \* \*